US008979345B2

(12) United States Patent
Park et al.

(10) Patent No.: US 8,979,345 B2
(45) Date of Patent: Mar. 17, 2015

(54) SURFACE LIGHT EMITTING APPARATUS INCLUDING AN OPTICAL DISTRIBUTOR

(71) Applicant: Electronics and Telecommunications Research Institute, Daejeon (KR)

(72) Inventors: Suntak Park, Daejeon (KR); Seung Koo Park, Daejeon (KR); Min-Su Kim, Daejeon (KR); Ki Uk Kyung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/658,231

(22) Filed: Oct. 23, 2012

(65) Prior Publication Data

US 2013/0223098 A1 Aug. 29, 2013

(30) Foreign Application Priority Data

Feb. 29, 2012 (KR) .................. 10-2012-0020896

(51) Int. Cl.
*F21V 8/00* (2006.01)
*G09F 13/04* (2006.01)
*F21V 33/00* (2006.01)
*F21W 121/00* (2006.01)
*F21Y 101/02* (2006.01)
*F21Y 105/00* (2006.01)

(52) U.S. Cl.
CPC .............. *G02B 6/0001* (2013.01); *F21V 33/006* (2013.01); *F21W 2121/00* (2013.01); *F21Y 2101/025* (2013.01); *F21Y 2105/00* (2013.01); *G02B 6/0028* (2013.01); *G02B 6/0031* (2013.01); *G02B 6/006* (2013.01); *G09F 13/04* (2013.01)
USPC ........................... 362/610; 362/609; 362/608

(58) Field of Classification Search
USPC ......... 362/610, 500, 609, 608; 385/32, 16, 50
See application file for complete search history.

(56) References Cited

U.S. PATENT DOCUMENTS

| 2006/0188198 | A1 | 8/2006 | Charters et al. | |
|---|---|---|---|---|
| 2009/0100727 | A1 | 4/2009 | Chen | |
| 2009/0310350 | A1* | 12/2009 | Dalton et al. | 362/235 |
| 2011/0215342 | A1* | 9/2011 | Oliver | 257/81 |
| 2012/0020113 | A1* | 1/2012 | Zheng et al. | 362/612 |
| 2012/0134177 | A1* | 5/2012 | Kim et al. | 362/607 |
| 2013/0208508 | A1* | 8/2013 | Nichol et al. | 362/612 |

FOREIGN PATENT DOCUMENTS

| JP | 2007-123574 A | 5/2007 |
|---|---|---|
| KR | 10-1050252 B1 | 7/2011 |

* cited by examiner

*Primary Examiner* — Tracie Y Green
(74) *Attorney, Agent, or Firm* — Rabin & Berdo, P.C.

(57) ABSTRACT

The present disclosure relates to a surface light emitting apparatus including: a light source bar including a light source for generating an optical signal; at least one optical distributor for dividing the optical signal generated in the light source into a plurality of optical signals; a light guide plate for confining the plurality of optical signals divided by the optical distributor in an inside thereof and transfer the optical signals; and a scattering pattern formed on a surface of the light guide plate and for emitting a light by the optical signal transferred through the light guide plate.

9 Claims, 11 Drawing Sheets

SURFACE LIGHT EMITTING APPARATUS INCLUDING AN OPTICAL DISTRIBUTOR

CROSS-REFERENCE TO RELATED APPLICATIONS

This application is based on and claims priority from Korean Patent Application No. 10-2012-0020896, filed on Feb. 29, 2012, with the Korean Intellectual Property Office, the disclosure of which is incorporated herein in its entirety by reference.

TECHNICAL FIELD

The present disclosure relates to a surface light emitting apparatus for a surface lighting and a signboard, and more particularly, to a surface light emitting apparatus which is thin, can be rolled in a tube-shape, and is used in a surface lighting, as well as an advertisement board, a guide board, a sign, and a signboard, such as a wall for decoration, displaying a logo, a character, a design, and a number.

BACKGROUND

A surface light emitting apparatus for emitting light through a surface area has been used in various fields. Especially, the surface light emitting apparatus is used the most as a backlight, a signboard, and an advertisement board, and there is a very high possibility in that the surface light emitting apparatus will be applied as an interior lighting or lightings for other industries in the future.

Figure 1:
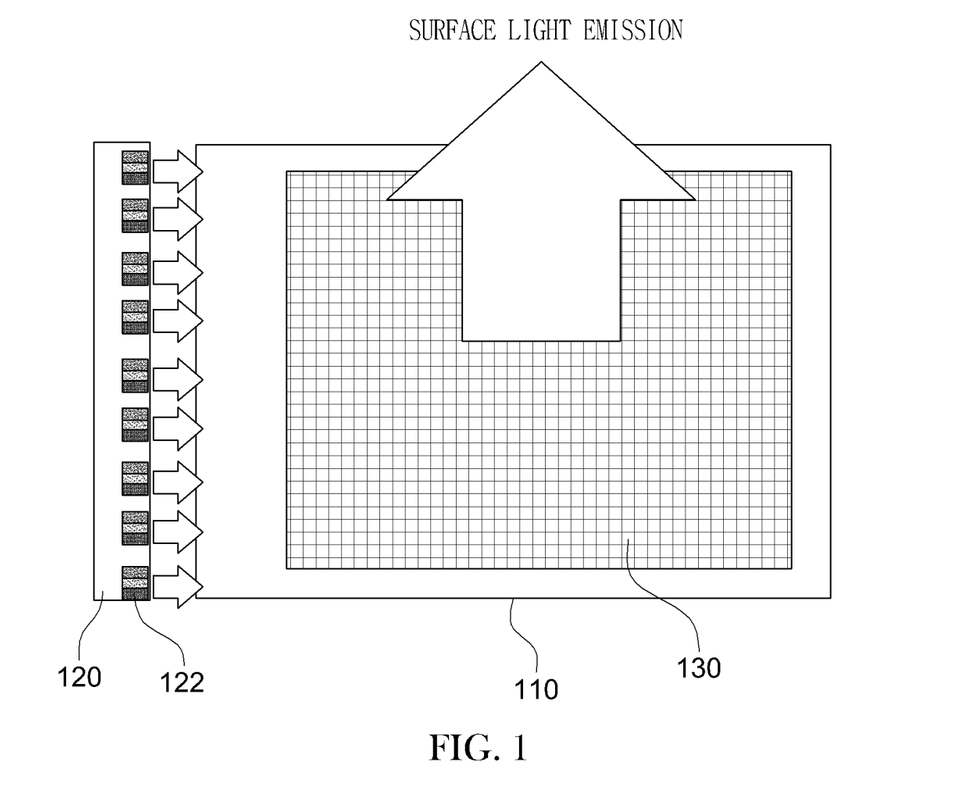
FIG. 1 is a diagram illustrating a configuration of a conventional surface light emitting apparatus.

According to the development of LED light sources, an application field of the surface light emitting apparatus has been expanded, and a size of the surface light emitting apparatus has been decreased and structures of the surface light emitting apparatus becomes various. The backlight using an LED light source is mainly used as a light source of a very thin LCD, and has a structure illustrated in FIG. 1. The conventional surface light emitting apparatus includes a light guide plate 110 having a scattering pattern and a light source bar 120 including LED light sources 122, and has a structure in which an optical signal is incident to a side surface of the light guide plate 110 and a surface light emission is generated in a direction vertical to the light guide plate 110 by a scattering pattern 130. The structure is used as an LED surface lighting or a backlight of an advertisement sheet.

Figure 2:
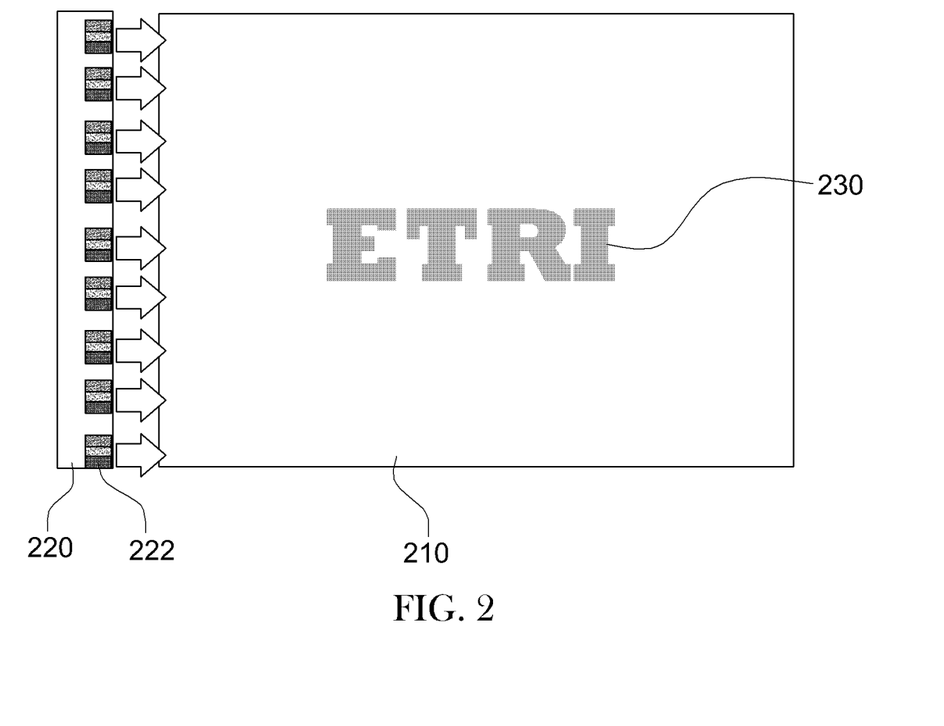
FIG. 2 is a diagram illustrating a configuration of a signboard using LED light sources.

FIG. 2 is a diagram illustrating a configuration of a signboard using LED light sources. The signboard has a similar structure to that of the backlight, however a scattering pattern 230 is not formed on an entire light guide plate 210, but rather is formed on a partial region of the light guide plate 210. The signboard is generally used as a display for transferring information, such as a telephone number, a price, a pattern and a phrase. Especially, signboards having various structures using the LED have been recently suggested, and an advertisement effect is obtained through a new function.

However, the conventional surface light emitting apparatus has a structure in which a plurality of LED light sources are arranged in one side surface or both side surfaces of the light guide plate. Accordingly, when a size of the light guide plate is increased, a large number of LED sources are required. Further, since a thick and hard acryl plate is used as the light guide plate, the light guide plate cannot be bent. Further, when the light guide plate is thin, strength of the light incident to the light guide plate from the LED light source is very small, so that there is a disadvantage in that it is difficult to realistically implement the surface light emitting apparatus.

The aforementioned disadvantages deteriorate the applicability of the surface light emitting apparatus to various fields, such as a surface light source, a signboard and a banner, using a light.

SUMMARY

The present disclosure has been made in an effort to provide a surface light emitting apparatus capable of minimizing the number of light sources used in a surface lighting or a signboard.

An exemplary embodiment of the present disclosure provides a surface light emitting apparatus, including: a light source bar including a light source configured to generate an optical signal; at least one optical distributor configured to divide the optical signal generated in the light source into a plurality of optical signals; a light guide plate configured to confine the plurality of optical signals divided by the optical distributor in an inside thereof and transfer the optical signals; and a scattering pattern formed on a surface of the light guide plate and configured to emit a light by the optical signal transferred through the light guide plate.

As described above, the present disclosure provides the surface light emitting apparatus including an optical distributor, so that it is possible to minimize the number of light sources used in a surface lighting or a signboard having a wide area light guide plate, i.e. a wide area light emitting surface, and implement the surface light emitting apparatus that is very thin, i.e. 100 μm or less, or is in a form of a flexible film.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, exemplary embodiments of the present disclosure will be described in detail with reference to the accompanying drawings. In describing the present disclosure, a detailed description of related known configurations and functions will be omitted when it may make the essence of the present disclosure obscure.

Figure 3:
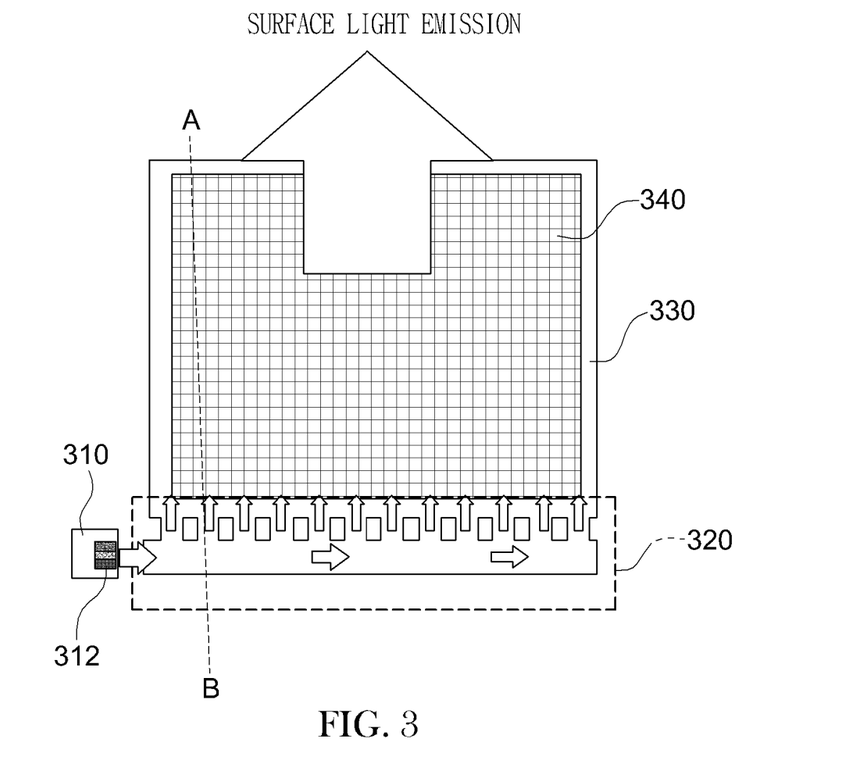
FIG. 3 is a diagram illustrating a configuration of a surface light emitting apparatus according to an exemplary embodiment of the present disclosure.
Figure 4:
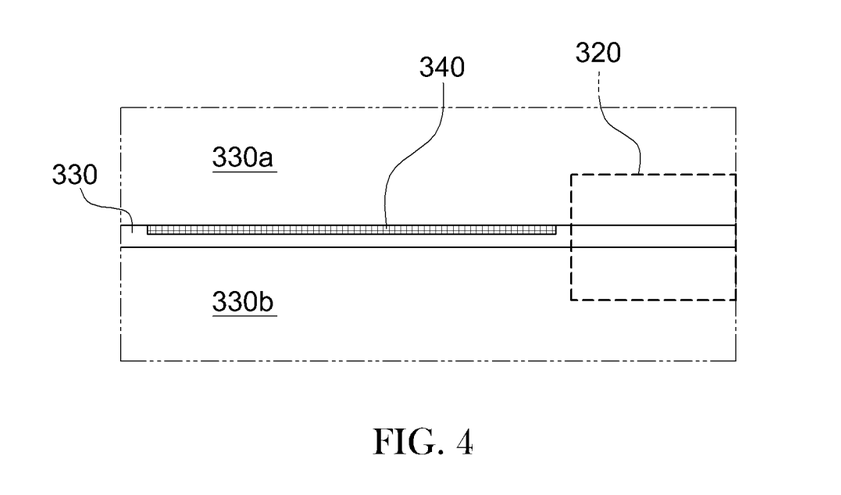
FIG. 4 is a cross-sectional view illustrating the surface light emitting apparatus taken along line AB of FIG. 3.

FIG. 3 is a diagram illustrating a configuration of a surface light emitting apparatus according to an exemplary embodiment of the present disclosure, and FIG. 4 is a cross-sectional view illustrating the surface light emitting apparatus taken along line AB of FIG. 3.

Referring to FIGS. 3 and 4, the surface light emitting apparatus according to the present disclosure includes a light source bar 310, an optical distributor 320, a light guide plate 330 and a scattering pattern 340.

The light source bar 310 includes a light source 312 for generating an optical signal. Here, the light source 312 may be a laser diode (LD), as well as a light emitting diode (LED). Since the LD has a larger quantity of light incident to a core layer, i.e., the light guide plate 330, from the light source 312 than the LED, the LD needs to be used. The reason is that the LD has a smaller light emitting area and a smaller light diffusion angle than the LED. Further, when the LD is used as the light source 312, the light guide plate 330 formed of a core layer having 50 μm or less may be implemented, so that a surface lighting or a signboard having flexibility, like a film, may be manufactured.

The optical distributor 320 is arranged between the light source bar 310 and the light guide plate 330, and divides the optical signal generated in the light source 312 into multiple optical signals and makes the divided optical signals be incident to the light guide plate 330. To this end, the optical distributor 320 has a planar optical waveguide structure including three layers, i.e., an upper clad layer 330a, a core layer 330 and a lower clad layer 330b, and the light incident to the core layer 330 is transferred only to an inside of the core layer 330 through the planar optical waveguide structure.

The light guide plate 330 serves to confine the multiple optical signals divided by the optical distributor 320 and transfer the optical signals. Here, the light guide plate 330 serves as the core layer of the optical waveguide, and upper and lower air serves as the clad layers 330a and 330b. In this case, a refractive index of the core layer 330 is higher than those of the clad layers 330a and 330b, so that the light guide plate 330 has the same basic structure as that of the optical waveguide in which the light is transferred in the inside of the core layer 330 while being totally reflected.

The scattering pattern 340 is formed on a surface of the light guide plate 330, to emit a light by the optical signal transferred through the light guide plate 330.

Figure 5:
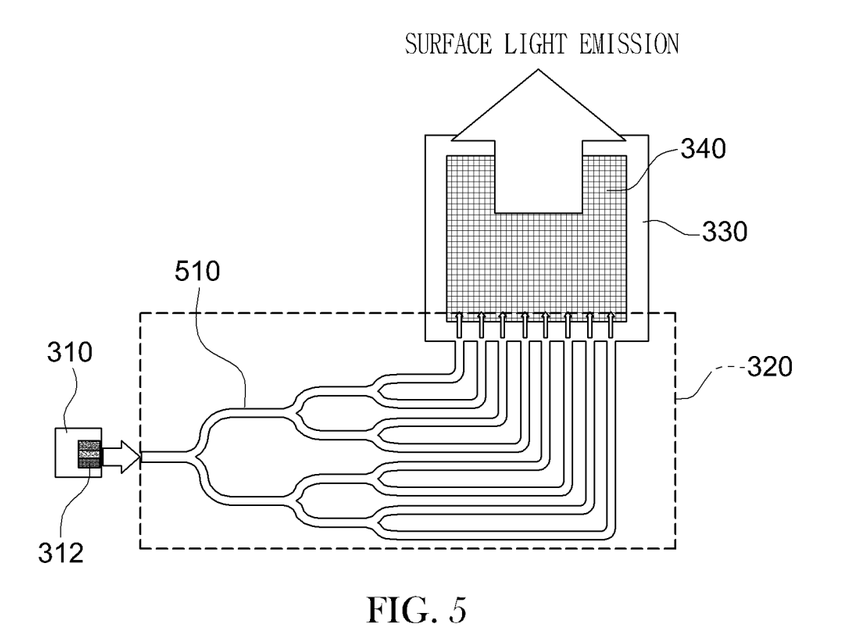
FIG. 5 is a diagram illustrating a configuration of an optical distributor based on a 3D optical waveguide in a surface light emitting apparatus according to an exemplary embodiment of the present disclosure.

FIG. 5 is a diagram illustrating a configuration of an optical distributor based on a 3D optical waveguide in a surface light emitting apparatus according to an exemplary embodiment of the present disclosure.

As illustrated in FIG. 5, the optical distributor 320 in the surface light emitting apparatus according to the exemplary embodiment of the present disclosure may be formed of a Y-branch 3D optical waveguide 510. Here, the optical distributor 320 formed of the Y-branch 3D optical waveguide 510 functions to divide the light incident from one light source into multiple lights and transfer the lights, like the incidence of multiple light sources into the light guide plate 330.

The optical distributor 320 formed of the Y-branch 3D optical waveguide 510 may transfer the light to a desired position without loss by confining the light even in both sides, as well as upper and lower sides.

Further, when the optical distributor 320 formed of the Y-branch 3D optical waveguide 510 includes two or more light sources, the number of optical distributors 320 may be increased according to the number of light sources and the light emitting surface may be partially turned on/off.

Figure 6:
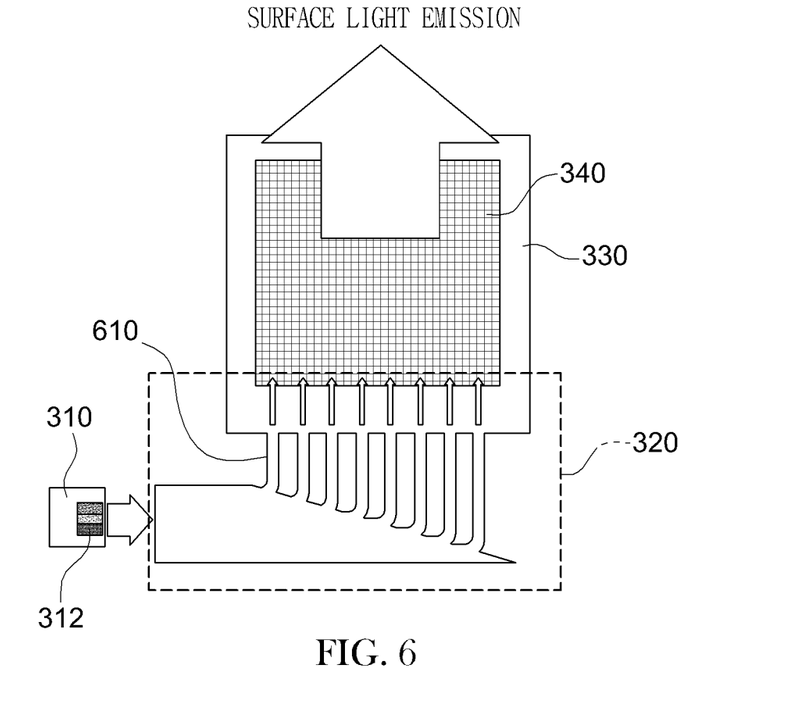
FIG. 6 is a diagram illustrating a configuration of an optical distributor based on a comb-shaped optical waveguide in a surface light emitting apparatus according to an exemplary embodiment of the present disclosure.

FIG. 6 is a diagram illustrating a configuration of the optical distributor based on a comb-shaped optical waveguide in a surface light emitting apparatus according to an exemplary embodiment of the present disclosure.

As illustrated in FIG. 6, the optical distributor 320 in the surface light emitting apparatus according to the exemplary embodiment of the present disclosure may be formed of a comb-shaped optical waveguide 610. Here, the optical distributor 320 formed of the comb-shaped optical waveguide 610 divides the light incident to the wide optical waveguide with multiple small optical waveguides again and makes the divided lights be incident to the light guide plate 330. This increases alignment tolerance of the light source 310 and the optical waveguide, thereby being advantageous to integrate the light source 310 and the optical distributor 320. Further, the light is combined in the wide optical waveguide from the light source 310, so that the loss of the light combination may be minimized.

Further, even if the optical distributor 320 formed of the comb-shaped optical waveguide 610 uses two or more light sources, the number of optical distributors 320 does not need to be increased.

Figure 7A:
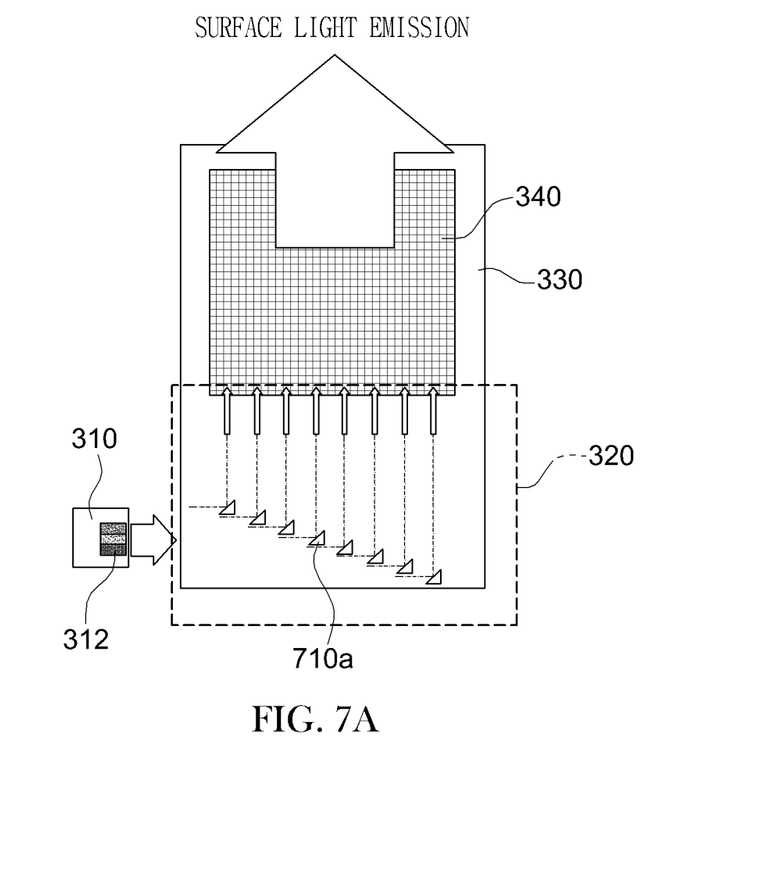
FIGS. 7A and 7B are diagrams illustrating a configuration of an optical distributor using a micro mirror array, instead of an optical waveguide, in a surface light emitting apparatus according to an exemplary embodiment of the present disclosure.
Figure 7B:
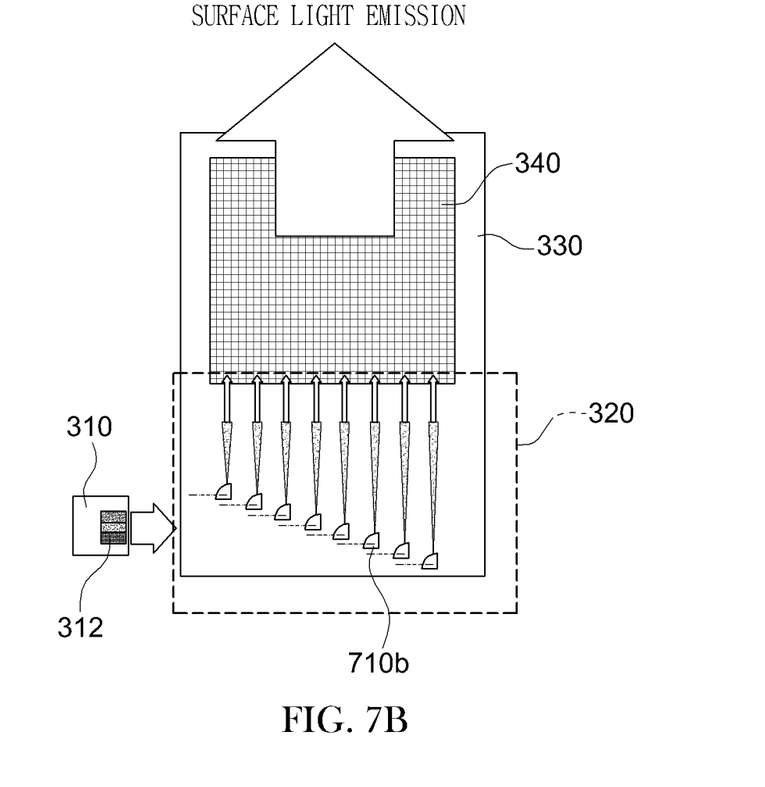

FIGS. 7A and 7B are diagrams illustrating a configuration of the optical distributor using a micro mirror array, instead of an optical waveguide, in a surface light emitting apparatus according to an exemplary embodiment of the present disclosure.

Referring to FIG. 7A, the optical distributor 320 may be formed of a plurality of micro triangular mirrors 710a. The plurality of micro triangular mirrors 710a is arranged in a regular interval, and functions to reflect the incident light in 90° and uniformly transfer the light to the light guide plate 330. Here, a size of and an interval between the plurality of micro triangular mirrors 710a are adjusted according to a size of the light guide plate 330, so that the light may be uniformly transferred to the light guide plate 330. The optical distributor 320 having the aforementioned structure is advantageous to transfer the light to the light guide plate 330 in parallel. However, the interval between the plurality of micro triangular mirrors 710a is excessively large, uniformity of the light may be decreased.

Referring to FIG. 7B, the optical distributor 320 may be formed of a plurality of micro curved mirrors 710b. The plurality of micro curved mirrors 710b simultaneously makes the light incident to the optical distributor 320 from the light source 310 be reflected and spread, so that the light may be uniformly transferred compared to the use of the plurality of micro triangular mirrors 710a.

Figure 8:
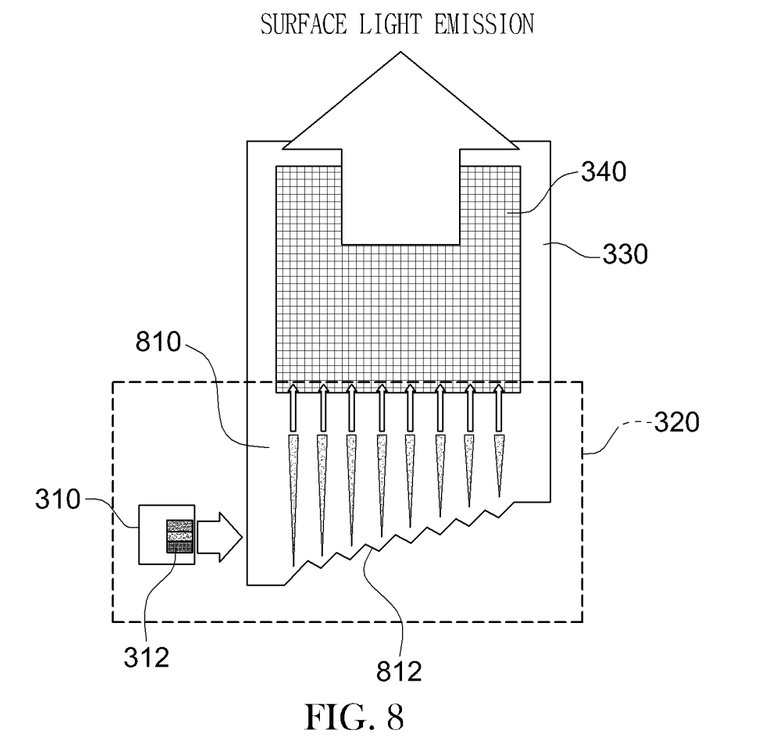
FIG. 8 is a diagram illustrating a configuration of an optical distributor based on a sawtooth-shaped optical waveguide in a surface light emitting apparatus according to an exemplary embodiment of the present disclosure.

FIG. 8 is a diagram illustrating a configuration of the optical distributor based on a sawtooth-shaped optical waveguide in a surface light emitting apparatus according to an exemplary embodiment of the present disclosure.

As illustrated in FIG. 8, the optical distributor 320 in the surface light emitting apparatus according to the exemplary embodiment of the present disclosure may be formed of a sawtooth-shaped optical waveguide 810. Here, the optical distributor 320 formed of the sawtooth-shaped optical waveguide 810 divides the light incident to the wide optical waveguide into multiple lights reflected by a part 812 shaped like sawtooth and makes the divided lights be incident to the light guide plate 330. Here, the sawtooth-shaped part 812 may reflect the light by a difference of refractive indexes of a material of the sawtooth-shaped optical waveguide 810 and the air, or be metal coated on a side surface of the sawtooth-shaped optical waveguide 810, so as to reflect the light like a mirror.

A design and a manufacturing process of the sawtooth-shaped optical waveguide 810 are simple, so that there is an effect in that it is advantageous to integrate the light source 310 and the optical distributor 320 and manufacturing costs are reduced. Further, even if the optical waveguide 320 formed of the sawtooth-shaped optical waveguide 810 uses two or more light sources, the number of optical distributors 320 does not need to be increased.

Figure 9:
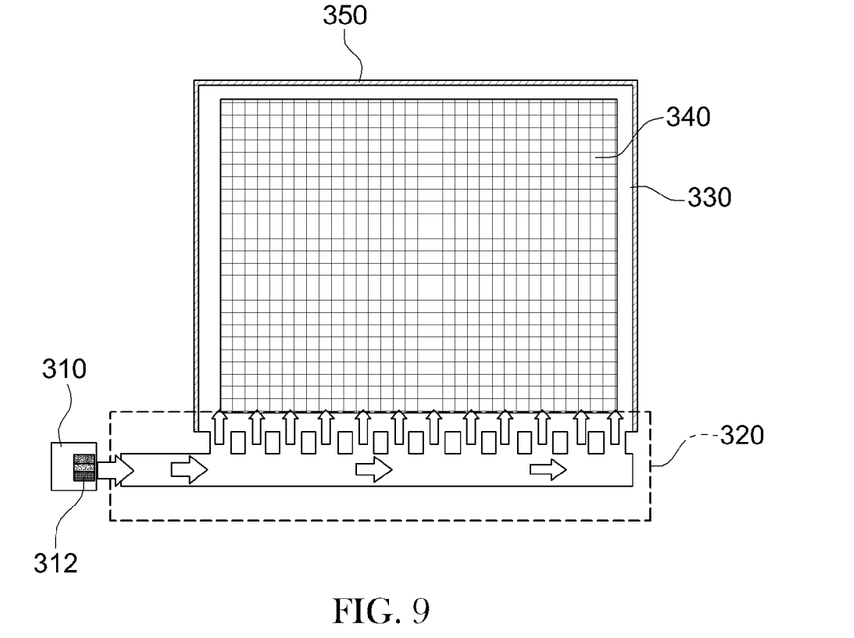
FIG. 9 is a diagram illustrating a configuration of a surface light emitting apparatus including a reflective coating layer.

FIG. 9 is a diagram illustrating a configuration of a surface light emitting apparatus including a reflective coating layer.

Referring to FIG. 9, the surface light emitting apparatus according to an exemplary embodiment of the present disclosure may include a reflective coating layer 350 under the light guide plate 330 or on three side surfaces having no optical distributor 320. Here, the reflective coating layer 350 may be variously formed by using a metal or a silver paste according to a structure and a material of the light guide plate 330. The reflective coating layer 350 prevents the light from leaking from the light guide plate 330 and improves scattering efficiency.

Further, the reflective coating layer 350 may be formed on a side surface of the optical distributor 320. Accordingly, the reflective coating layer 350 may minimize a light loss generated in the optical distributor 320.

Figure 10:
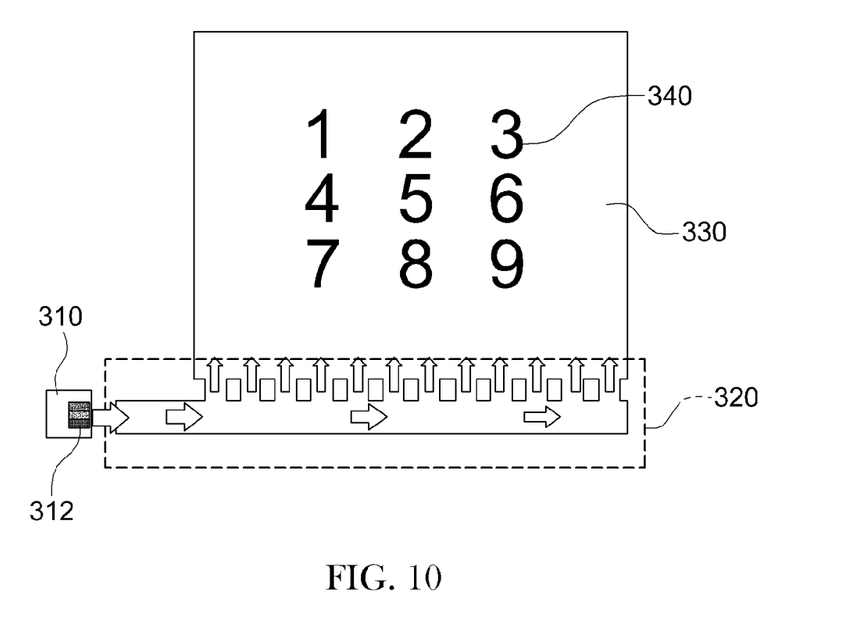
FIG. 10 is a diagram illustrating a configuration of a surface light emitting apparatus in which a scattering pattern is formed in a partial region of a light guide plate.

FIG. 10 is a diagram illustrating a configuration of the surface light emitting apparatus in which the scattering pattern is formed on a partial region of the light guide plate.

As illustrated in FIG. 10, the scattering pattern 230 is not formed on the entire light guide plate 330, but may be formed on a partial region of the light guide plate 330 in order to form a specific pattern, such as a number, a character or a pattern.

Figure 11:
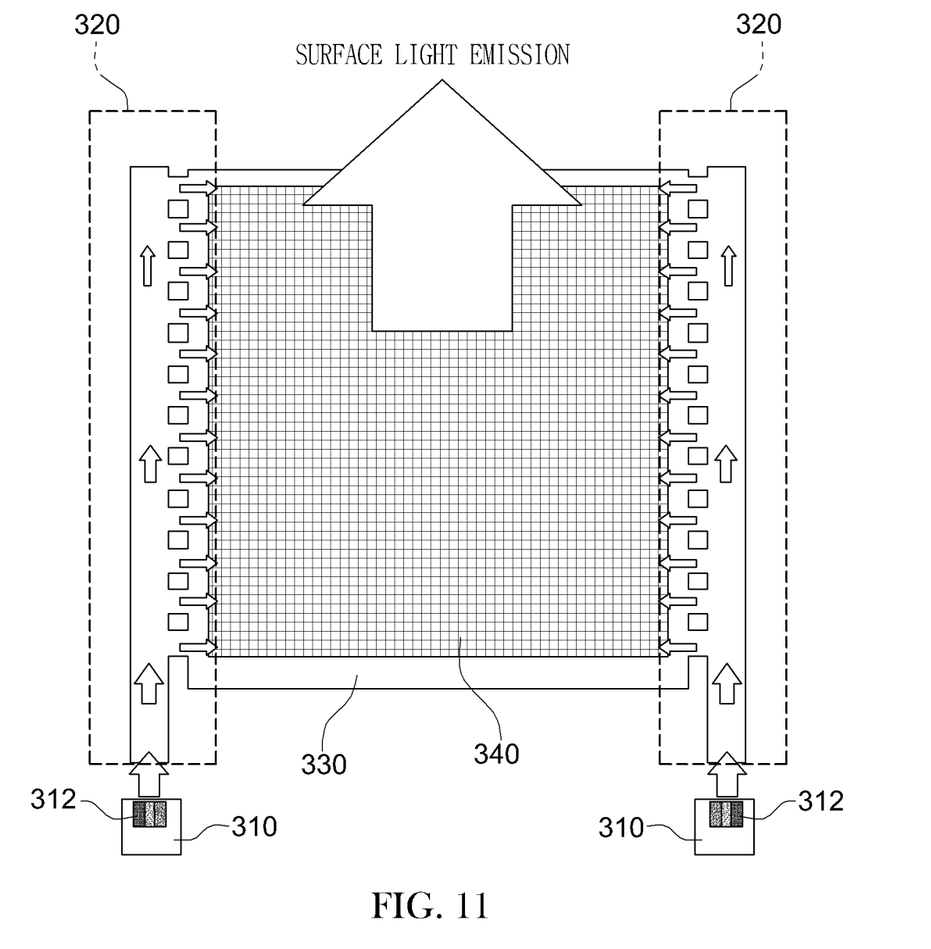
FIG. 11 is a diagram illustrating a configuration of a surface light emitting apparatus according to another exemplary embodiment of the present disclosure.

FIG. 11 is a diagram illustrating a configuration of a surface light emitting apparatus according to another exemplary embodiment of the present disclosure.

Referring to FIG. 11, the surface light emitting apparatus according to another exemplary embodiment of the present disclosure includes two optical distributors 320. Here, the two optical distributors 320 are formed on both side surfaces of the light guide plate 330, thereby increasing scattering uniformity in the surface light emission.

Although the two optical distributors 320 has been described as an example for the convenience of description in another exemplary embodiment of the present disclosure, the surface light emitting apparatus may include at least one optical distributor.

Figure 12:
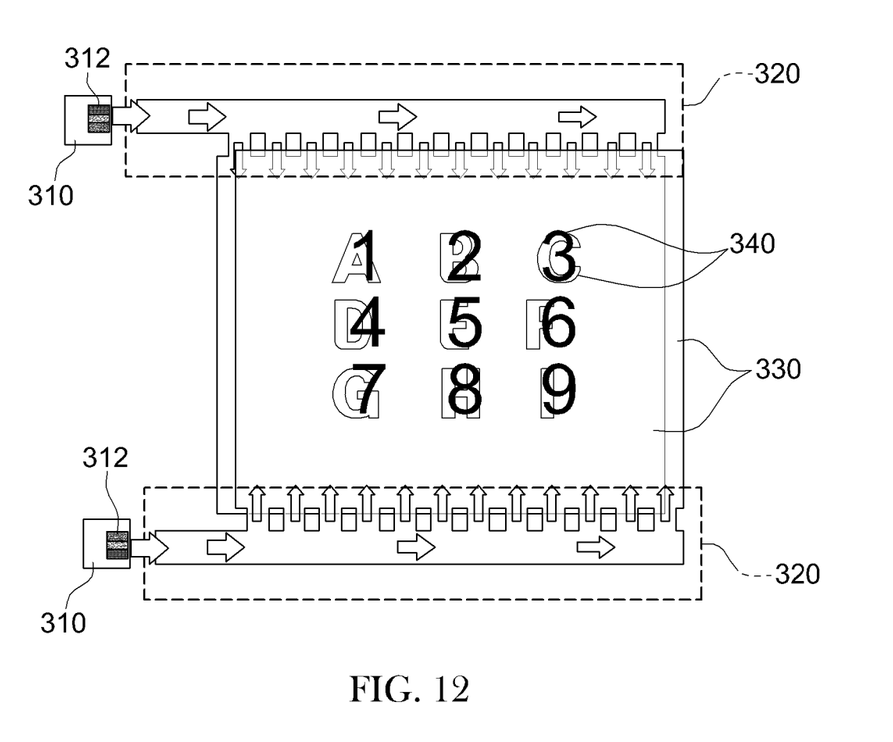
FIG. 12 is a diagram illustrating a configuration of a surface light emitting apparatus according to yet another exemplary embodiment of the present disclosure.

FIG. 12 is a diagram illustrating a configuration of a surface light emitting apparatus according to yet another exemplary embodiment of the present disclosure.

Referring to FIG. 12, the surface light emitting apparatus according to yet another exemplary embodiment of the present disclosure includes two layers. To this end, the surface light emitting apparatus according to yet another exemplary embodiment of the present disclosure includes two optical distributors 320 and two light guide plates 330 connected to the optical distributors 320. In this case, each of the light guide plates 330 may be formed in a film type, so that the two light guide plates 330 may be deposited like one film. Accordingly, the surface light emitting apparatus according to yet another exemplary embodiment of the present disclosure may implement various character conversion or color changes.

The exemplary embodiments disclosed in the specification of the present disclosure will not limit the present disclosure. The scope of the present disclosure will be interpreted by the claims below, and it will be construed that all techniques within the scope equivalent thereto belong to the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A surface light emitting apparatus, comprising:
a light source bar including a light source configured to generate an optical signal;
an optical distributor configured to divide the optical signal incident to the optical distributor into a plurality of optical signals;
a light guide plate configured to confine the plurality of optical signals incident to the light guide plate in an inside thereof and transfer the plurality of optical signals; and
a scattering pattern formed on a surface of the light guide plate and configured to emit a light by the optical signal transferred through the light guide plate;
wherein the optical distributor is one of a Y-branch 3D optical waveguide, a comb-shaped optical waveguide, a sawtooth-shaped optical waveguide, and a waveguide including a plurality of micro triangular minors or a plurality of micro curved mirrors;
wherein the optical distributor is a planar optical wave guide structure; and
wherein the optical signal incident to the optical distributor and the plurality of optical signals incident to the light guide plate are on the same plane.

2. The surface light emitting apparatus of claim 1, further comprising a reflective coating layer for reflecting the light, the reflective coating layer being formed on a back surface or a side surface of the light guide plate.

3. The surface light emitting apparatus of claim 2, wherein the reflective coating layer is formed of a metal or a silver paste.

4. The surface light emitting apparatus of claim 1, wherein the surface light emitting apparatus includes a plurality of optical distributors.

5. The surface light emitting apparatus of claim 4, wherein the light guide plate includes a plurality of layers corresponding to the respective optical distributors.

6. The surface light emitting apparatus of claim 1, wherein a core layer of the optical distributor and a core layer of the light guide plate are formed on an identical layer for transferring a light incident to the core layer only to an inside of the core layer.

7. The surface light emitting apparatus of claim 1, wherein angles between the optical signal incident to the optical distributor and the plurality of optical signals incident to the light guide plate are over 0 degrees and under 180 degrees.

8. The surface light emitting apparatus of claim 1, wherein the plurality of micro triangular minors or the plurality of micro curved mirrors are arranged in a regular interval for reflecting the optical signal generated in the light source and uniformly transferring the reflected optical signal to the light guide plate.

9. The surface light emitting apparatus of claim 1, wherein the plurality of micro triangular minors or the plurality of micro curved mirrors has a shape of a straight line, a curved line, or a bent shape.

\* \* \* \* \*